(12) United States Patent
Shulman et al.

(10) Patent No.: US 7,814,461 B2
(45) Date of Patent: *Oct. 12, 2010

(54) COMPUTER PROGRAMMING LANGUAGE STATEMENT BUILDING AND INFORMATION TOOL

(75) Inventors: Matthew Shulman, Bellevue, WA (US); Matthew James Curland, Redmond, WA (US); Martin Cibulka, Redmond, WA (US); David Anthony Sobeski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1001 days.

This patent is subject to a terminal disclaimer.

(21) Appl. No.: 11/509,248

(22) Filed: Aug. 23, 2006

(65) Prior Publication Data

US 2007/0006142 A1    Jan. 4, 2007

Related U.S. Application Data

(63) Continuation of application No. 09/970,409, filed on Oct. 3, 2001, now Pat. No. 7,322,023, which is a continuation of application No. 09/391,057, filed on Sep. 7, 1999, now Pat. No. 6,311,323, which is a continuation of application No. 08/863,822, filed on May 27, 1997, now Pat. No. 6,026,233.

(51) Int. Cl.
*G06F 9/44* (2006.01)
*G06F 3/00* (2006.01)
*G06F 3/048* (2006.01)

(52) U.S. Cl. .................. 717/109; 717/110; 717/126; 715/711; 715/705

(58) Field of Classification Search .......... 717/106–116
See application file for complete search history.

(56) References Cited

U.S. PATENT DOCUMENTS

| 4,617,643 A | * | 10/1986 | Klock et al. ............. 715/273 |
| 4,931,928 A | | 6/1990 | Greenfeld ................ 717/131 |
| 5,006,992 A | | 4/1991 | Skeirik .................... 706/58 |
| 5,263,174 A | | 11/1993 | Layman ................... 715/841 |
| 5,377,318 A | | 12/1994 | Wolber .................... 715/809 |

(Continued)

OTHER PUBLICATIONS

"Access 97 Expert Solutions," Que, 2 pages, 1996.

(Continued)

*Primary Examiner*—Thomas K Pham
(74) *Attorney, Agent, or Firm*—Woodcock Washburn LLP

(57) ABSTRACT

An intelligent real time tool to assist a computer programmer during the writing and/or maintenance of a computer program. The tool generates assist windows that contain program related information that the programmer can use to construct a programming language statement and/or to obtain real time information about a programming language statement. An assist window can be automatically displayed as determined by the tool itself, and/or manually displayed on demand in response to a user input command. An assist window displays two general categories of information including but not limited to selection menu information based on a partial compilation of all programming language statements, and informational displays based on a partial compilation and a reverse parse of an immediate programming language statement. The statement generating tool assist windows are non-intrusive to programmer input and can be ignored by the programmer by merely continuing to type an immediate programming language statement without interacting with the assist windows that are proximate the programming language statement being constructed by the programmer.

20 Claims, 11 Drawing Sheets

U.S. PATENT DOCUMENTS

| | | | |
|---|---|---|---|
| 5,430,836 A | 7/1995 | Wolf et al. | 715/744 |
| 5,485,618 A | 1/1996 | Smith | 715/710 |
| 5,537,630 A | 7/1996 | Berry et al. | 715/763 |
| 5,557,730 A | 9/1996 | Frid-Nielsen | 345/839 |
| 5,577,241 A | 11/1996 | Spencer | 707/5 |
| 5,579,469 A | 11/1996 | Pike | 345/781 |
| 5,603,021 A * | 2/1997 | Spencer et al. | 707/4 |
| 5,627,958 A | 5/1997 | Potts et al. | 715/708 |
| 5,628,016 A | 5/1997 | Kukol | 717/140 |
| 5,644,737 A | 7/1997 | Tuniman et al. | 715/810 |
| 5,649,222 A | 7/1997 | Mogilevsky | 715/533 |
| 5,652,899 A * | 7/1997 | Mays et al. | 715/239 |
| 5,671,403 A | 9/1997 | Shekita et al. | 707/3 |
| 5,673,390 A | 9/1997 | Mueller | 714/57 |
| 5,680,630 A | 10/1997 | Saint-Laurent | 715/534 |
| 5,694,559 A | 12/1997 | Hobson et al. | 715/705 |
| 5,724,593 A | 3/1998 | Hargrave, III et al. | 704/7 |
| 5,734,749 A | 3/1998 | Yamada et al. | 382/182 |
| 5,740,444 A | 4/1998 | Frid-Nielsen | 717/102 |
| 5,790,778 A | 8/1998 | Bush et al. | 714/38 |
| 5,798,757 A | 8/1998 | Smith | 715/709 |
| 5,813,019 A | 9/1998 | Van De Vanter | 715/512 |
| 5,825,355 A | 10/1998 | Palmer et al. | 715/712 |
| 5,844,554 A | 12/1998 | Geller et al. | 714/744 |
| 5,845,300 A | 12/1998 | Comer et al. | 715/508 |
| 5,850,561 A | 12/1998 | Church et al. | 707/532 |
| 5,859,638 A | 1/1999 | Coleman et al. | 715/786 |
| 5,877,758 A | 3/1999 | Seybold | 345/866 |
| 5,905,892 A | 5/1999 | Nielsen et al. | 717/145 |
| 5,911,075 A | 6/1999 | Glaser et al. | 717/100 |
| 5,924,089 A | 7/1999 | Mocek et al. | 707/4 |
| 5,940,615 A * | 8/1999 | Novick et al. | 717/109 |
| 5,959,629 A | 9/1999 | Masui | 715/808 |
| 5,987,251 A * | 11/1999 | Crockett et al. | 717/115 |
| 5,999,730 A * | 12/1999 | Lewis | 717/109 |
| 6,012,075 A | 1/2000 | Fein et al. | 715/540 |
| 6,016,467 A | 1/2000 | Newsted et al. | 704/9 |
| 6,018,524 A | 1/2000 | Turner et al. | 370/392 |
| 6,023,715 A | 2/2000 | Burkes et al. | 707/514 |
| 6,026,233 A | 2/2000 | Shulman et al. | 717/113 |
| 6,053,951 A | 4/2000 | McDonald et al. | 717/109 |
| 6,061,513 A | 5/2000 | Scandura | 717/142 |
| 6,071,317 A | 6/2000 | Nagel | 717/128 |
| 6,115,544 A | 9/2000 | Mueller | 714/57 |
| 6,119,120 A | 9/2000 | Miller | 707/101 |
| 6,163,879 A | 12/2000 | Mackey | 717/111 |
| 6,266,665 B1 | 7/2001 | Vaidyanathan et al. | 707/7 |
| 6,305,008 B1 | 10/2001 | Vaidyanathan et al. | 717/111 |
| 6,311,323 B1 | 10/2001 | Shulman et al. | 717/111 |
| 6,314,559 B1 * | 11/2001 | Sollich | 717/111 |
| 6,467,081 B2 | 10/2002 | Vaidyanathan et al. | 717/123 |
| 6,799,718 B2 * | 10/2004 | Chan et al. | 235/375 |

OTHER PUBLICATIONS

"Building Windows 98 Beta Process Crucial to Win98, Other Software," Windows 98, Jun. 1998, 103-106.

Franke et al., "Authoring a hypertext help manual," *ACM*, 1995, 238-245.

Goldberg, A., "Smalltalk-80 The Interactive Programming Environment," Chp. 16 spelling correction, pp. 354-362, chp. 17 Syntax errors pp. 364-374, 1984.

IBM Technical Disclosure Bulletin, "Automated Code Checker," Sep. 1993, 36(09B), 239-240.

IBM Technical Disclosure Bulletin, "Smalltalk Tokenizer and Backus-Naur Form Parser," Dec. 1994, 37(12), 313316.

McFedries, P., "Visual Basic for Application Unleashed," Sams MacMillan Computer Publishing, Mar. 21, 1997, (Excerpts printed).

Microsoft Corporation, "Building com Components that take Full Adv Visual Basic Scripting," *IVO Salmre*, 15 pages, 1998.

"Microsoft Office Developer Web Forum," Microsoft Access 97 Conversion Issues, 14 pages, 1997.

"Microsoft Office Developer Web Forum," Syntax at your Fingertips, Automatic Statement Building, 5 pages, 1996.

Pangoli, S. et al., "Automatic Generation of Task-Oriented Help," *UIST '95*, Nov. 14, 1995, 181-187.

"Programmability README for Early Test Release of Office 97," 1997, 8 pages.

Stekely, P. et al., "Automatic Generation of Help from Interface Design Models," *ACM*, 1994, 225-231.

Sukaviriya et al., "Automatic Generation of Textual, Audio and Animated Help in UIDE: The User Interface Design Environment," *AVI ACM*, Feb. 1994, 44-52.

*Visual Basic 5.0 was announced* Feb. 3, 1997, http://www.microsoft.com/presspass/press/1997/Feb97/VB5PROpr.asp.

*Visual Basic 6.0 was announced* Jun. 15, 1998, http://www.microsoft.com/presspass/press/1998/Jun98/VB6ancpr.asp.

Hegazi, A. et al., "Visual Craft: A Visual Integrated Development Environment," Proceedings of the Second IEEE Symposium on Computers and Communications, Jul. 1997, 210-214.

Kaiser, G. et al., "Intelligent Assistance for Software Development and Maintenance," IEEE Software, May 1988, 5(3), 40-49.

Microsoft Corporation, "Getting results with Microsoft Office for Windows 95, Version 7.0," Microsoft Press, 1995, 303.

Terveen, L. et al., "Intelligent Assistance for Software Construction: A Case Study," Proceedings of the Ninth Knowledge-Based Software Engineering Conference, Sep. 1994, 14-21.

"Programming Languages: Visual Basic 5 Night School," Overview of book with screen example, Mar. 1997.

Visual Basic 6.0 Documentation, Accessed on May 3, 2005, http://msdn.microsoft.com/library/default.asp?url=/library/en-us/vbcon98/html/vbconusingcodeeditor.asp.

U.S. Appl. No. 09/970,409 (MSFT-4160): Response to Rule 105 Communication dated Feb. 27, 2006, 17 pages.

U.S. Appl. No. 09/970,409 (MSFT-4160): Requirement Under Rule 105—Independent Communication dated Sep. 27, 2005, 4 pages.

U.S. Appl. No. 09/970,409 (MSFT-4160): Amendment and Information Disclosure Statement dated May 3, 2005, 35 pages.

\* cited by examiner

```
Project1 - Module1 (Code)
(General)                    MyProc

Enum MyColor
    blue
    green
    red
End Enum

Sub MyProc(Name As String, c As MyColor, Optional i As Integer = 2)
    ...
End Sub Sub MainProc()
    MyProc "Smith", blue, 15
         ↑910  ↑911  ↑912
    ┌─────────────────────────────────────────────────────┐
    │ MyProc(Name As MyColor, c As MyColor, [i As Integer = 2]) │
    └─────────────────────────────────────────────────────┘
         741   742                          743
```

FIG. 9

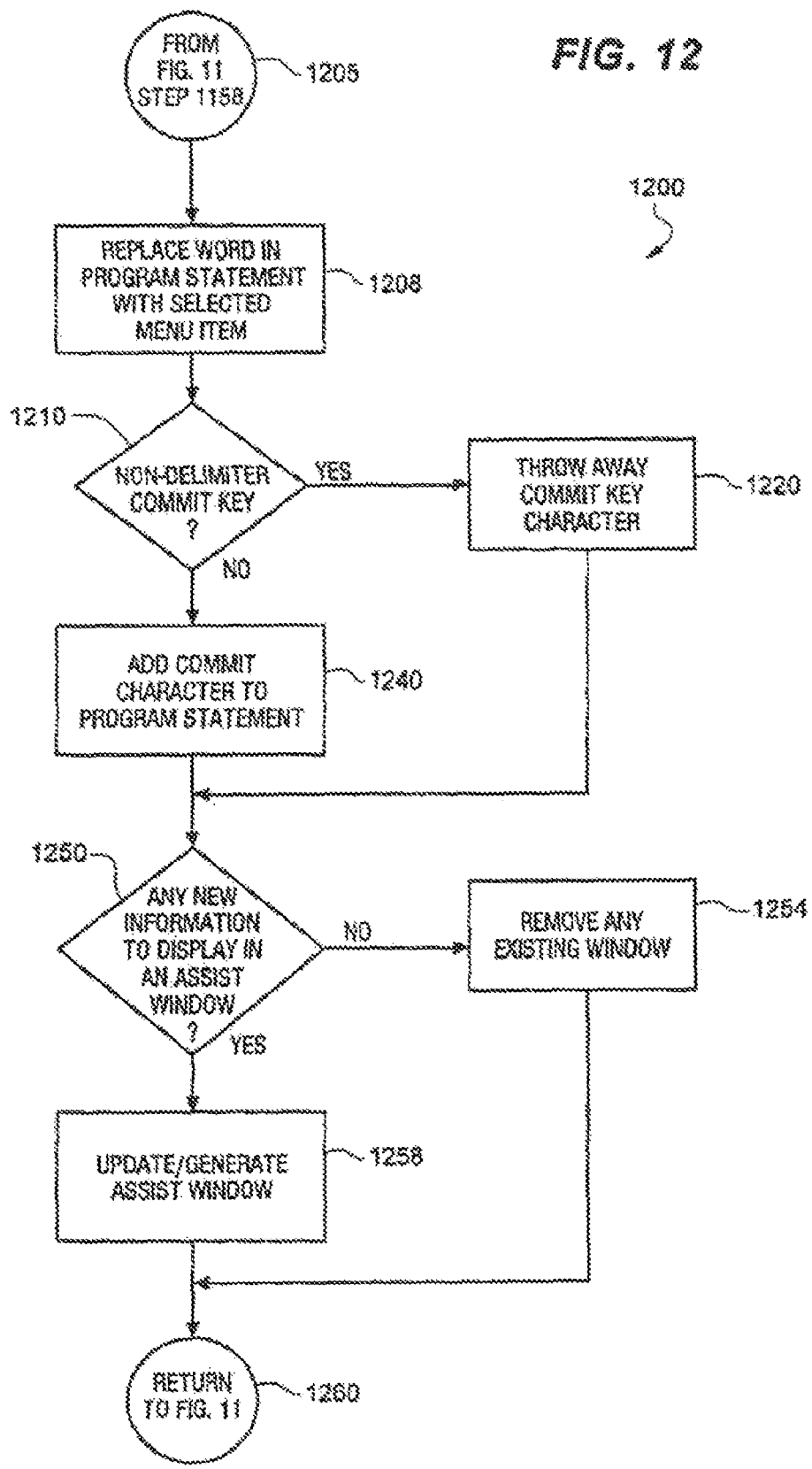

COMPUTER PROGRAMMING LANGUAGE STATEMENT BUILDING AND INFORMATION TOOL

CROSS REFERENCE TO RELATED APPLICATIONS

This invention is a continuation of related U.S. patent application Ser. No. 09/970,409, filed Oct. 3, 2001, now U.S. Pat. No. 7,322,023, which is a continuation of U.S. patent application Ser. No. 09/391,057, filed Sep. 7, 1999, now U.S. Pat. No. 6,311,323, which is a continuation of U.S. patent application Ser. No. 08/863,822, filed May 27, 1997, now U.S. Pat. No. 6,026,233, each of which is hereby incorporated by reference in its entirety.

This invention relates to the field of computer programming tools and in particular to an intelligent real time tool to assist a computer programmer during the writing, evaluation, and/or maintenance of a computer program.

BACKGROUND OF THE INVENTION

Problem

Two related problems exist in the field of computer programming that include, but are not limited to, generating a computer program quickly and accurately on a first attempt, and maintaining a computer program with a minimal amount of effort once a computer program exists. The two related problems exist due to many factors that include, but are not limited to, the increasing complexity of computer programs generally, the architectural modularity of computer programs, and the increasing distribution of programmers that are contributing to a common program across campuses, countries, and even continents. Each of these factors places a premium on the efficiency of a programmer whose role is to develop and/or maintain a computer program.

It is a problem for a computer programmer to generate a computer program in a high level programming language quickly and accurately on a first attempt. To generate a large and/or complex computer program, the programmer must be able to enter computer programming language statements quickly and accurately in a traditionally manual process that is also referred to as "writing code" or "coding". The process of entering computer programming language statements is typically done one keystroke and one statement at a time by way of a typewriter style keyboard input system that commonly accompanies most computing systems.

As a computer program evolves during the coding process, accuracy becomes a particular problem due in part to the arcane syntax of programming languages in addition to the often cryptic grammar and/or spelling that is characteristic of programmer-declared object entities in a computer program, such as variable names, parameter names, structure names, structure members, object names, object property types, and the like. Not only must references to a declared entity be spelled correctly, the declared entity must also be used in the correct context and syntax if the resulting computer program is expected to compile without errors and/or execute as intended.

Examples of commercially available and widely used programming languages include, but are not limited to, object oriented programming languages such Visual Basic or C++. Object oriented programming languages, as with most traditionally used high level programming languages, contain types of programming language statements that can be grouped into two basic categories. The basic categories include, but are not limited to, operator embedded statements and procedure calls. For example purposes only, object oriented programming language examples are the focus of the remaining discussion.

An operator embedded statement includes at least one defined object entity that is used with varying combinations of unary, binary, and/or assignment operators. An object entity is a basic building block of an object oriented programming language statement and typically includes a hierarchical object name and member name format such as the following:

<object name> <operator> <member name> where <object name> and <member name> are discrete hierarchical segments of an object oriented programming language structure. An <operator> is a character defined by the programming language syntax that in the present example separates, delineates and/or indicates a syntactic relationship, between an object and a member of the object. Common examples of these delimiting type operator characters include the dot "." and the pointer u->" characters, in addition to the parenthesis "( )" and the square brackets "[ ]".

There are typically multiple objects defined in an object oriented computer program, any one of which can be used for the <object name> segment of a programming language statement. For any given object identified by <object name>, there can be multiple members and/or levels of members that can be validly used for the <member name> segment of a programming language statement. A named member is often referred to as a property or method. A valid combination of <object name> and <member name> together define an object entity that may be of any type including, but not limited to, a variable of some data type, a symbolic constant of some data type, or an array or structure or union, or any portion thereof.

Sets of <object name> and <member name> object entities can be separated by or used in conjunction with operators that can include, but are not limited to, logical, bitwise logical, relational, arithmetic, or character manipulation operators, from the well known sets of unary, binary, and assignment operators that are common among programming languages. Unary, binary, and assignment operators can include the above identified delimiter operators in addition to any one or combination of the set of characters $\{=-+^!:<>/\}$. One example of object entities used in an expression is the following simple assignment statement:

<object name> <member name>=<value> where <value> is some object entity or constant having a data type that is compatible with the object entity defined by <object name> and <member name>. Another example of object entities used in an expression can include:

<object entity 1>=<object entity 2>+<object entity 3>

However, with any of the above exemplary constructions of programming language statements, in addition to the variety of constructions not shown herein, at least one object entity must be constructed somewhere within the programming language statement. It is the construction of even one object entity that presents the opportunity for typographical errors, incorrect syntax, and other human programmer introduced problems.

Another fundamental category of programming language statement is the procedure call, also referred to as a function call. A procedure call can, but is not required to, include at least one argument in an argument list. The terms argument and argument list are often used as synonyms with and/or mixed and matched with the terms parameter and parameter list. For purposes of this discussion the terms argument and argument list are used. An argument is another type of object entity in a programming language. The basic format of a procedure call typically includes a procedure name followed by a comma-separated argument list within parentheses as follows:

<procedure name>(<argument 1>, ..., <argument n>)

The argument list may include mandatory or optional arguments or no arguments at all. If no arguments exist the parentheses may be present but empty or the parentheses may not exist at all. An argument can be an individual object entity or an expression as discussed above with embedded operators, or the argument can itself be a procedure call or an object having a selection of members to choose from. A common requirement of nested procedure calls is that the return value of the lowest level nested call must be returned so that a value exists for the argument that is the procedure call.

However, regardless of the number of arguments or the type of argument in an argument list for a given procedure call, each argument must resolve to a value of a specific type that is compatible with the argument definition. Further, each value for each argument must be located in a specific position in an argument list to avoid errors. It is the procedure name and the type, order, and mandatory or optional nature of arguments for the procedure that present numerous opportunities for typographical errors, incorrect syntax, and other human programmer introduced problems.

The difficulty in writing programming language statements is that the programmer must remember the statement syntax in addition to the spelling of and selection of the member names that correspond to the named object. Even if the same programmer is declaring and later referencing an object or member name, it can be easy to forget the exact spellings when there are hundreds of objects and members named in a complex program. This problem is even more pronounced where one programmer names an object and another programmer is expected to remember the cryptic name definition in an environment where the two programmers may not even know each other and may even be in different countries. Thus, in either case if a programmer can not remember either the syntax, spelling, or selection options that are necessary to complete a given programming language statement, then the programmer must stop and either look up the information in an on-line help system, printed manual pages; or consult a helpful co-worker who may know the answer. However, the result of having to stop to look up information is disruptive and very inefficient.

One solution to the above stated program generating problem is to simply enter programming language statements as rapidly as possible with little concern for precision of syntax, spelling, or selection options. Once some number of programming language statements have been entered, the program can be compiled to use the compiler as a filter to flag syntax, spelling, and option errors or incompatibilities. The programmer can then make an error correcting pass through the computer program to correct each error flagged by the compiler and repeat the error filtering process as many times as is necessary until the program is complete. However, this error filtering approach is extremely inefficient and has the potential to introduce large quantities of errors that can be difficult to distinguish in an overwhelming cascade of compiler errors. Further, some errors may escape the compiler altogether, only to be discovered as run time errors or logic errors.

It is also a problem for a computer programmer to maintain a computer program, or portion thereof, that was written by another programmer or was written by the same programmer long enough ago that specific details may have been forgotten. This is a particular problem in large and/or complex programs. In either case it is necessary for the maintaining computer programmer to become quickly familiar with all aspects of the maintained program. This means that the programmer must look up all structures, names, argument lists, choices, variables, and declared constants that are used in the body of a program which can take hours or days of searching depending on the complexity of a program and availability of information. Thus, working through unfamiliar computer programs can be a difficult and time consuming task.

Existing programming language coding techniques rely on a programmer's attention-to-detail, ongoing access to reference materials, peer code reviews, and other inefficient methods, none of which lend themselves to generating and/or maintaining large amounts of complex programming language code with any level of efficiency and accuracy. For these reasons, there exists a long felt need for a programming tool to assist the programmer in writing and/or maintaining a computer program accurately and efficiently. Such a solution has"heretofore not been known prior to the disclosure set forth and claimed below.

Solution

The above identified problems are solved and an advancement made in the programming tool field by the computer programming language statement building and information tool of the present invention. The present invention generates assist windows that contain program related information for use by a programmer to construct a programming language statement and/or to obtain real time information about a programming language statement. Constructing a programming language statement is a process referred to as statement building. The assist windows can be automatically displayed as determined by the tool itself. Alternatively, and/or in combination with the automatic features, a programmer can manually request that an assist window be displayed on demand. The automatic display feature can be enabled and disabled independent of and without inhibiting the manually requested assist window display feature of the present invention.

An assist window displays two general categories of information including, but not limited to, selection menu information, and informational display. One important feature of the statement generating tool is that assist windows are non-intrusive and can be ignored by the programmer by merely continuing to type an immediate programming language statement at a present character position cursor location without interacting with the assist windows. The assist windows continue to appear, disappear, and/or update in a location proximate to but out of the way of the present character position cursor location so long as the automatic assist window display feature is enabled.

Selection menu information in an assist window includes any finite list of previously declared entities and/or entity types that can validly be included at the present character position cursor location in a programming language statement. A selection menu includes at least one menu item. The set of the at least one menu item in a given selection menu is defined by the portion of the programming language statement that immediately precedes the present character position cursor location. A menu item being displayed in a selection menu can be accepted by the programmer in a manner that results in the selected menu item being automatically inserted into the immediate programming language statement at the present character position cursor location without the programmer having to type any or all of the characters of the selected menu item. Thus, a selection menu assist window supplies information about a programming language statement and the ability to build all or part of a programming language statement in a manner that the programmer can use or ignore individually or in combination according to the programmer's immediate needs.

The content of an informational display assist window can include, but is not limited to, a map of the argument list options for a procedure call that is identified by the present character position cursor location, specific values associated with defined constants in a programming language statement, and general programming language statement help information. For example, an argument list for a procedure call can include a highlighted argument that indicates the present character position cursor location within the argument list. The argument list may also include individual font, typeface, or additional characters to distinguish between mandatory and optional arguments within an argument list. The informational display assist window displays procedure call arguments in argument list order accompanied by any options that may exist for each argument in the list. An individual argument that requires or will accept a previously defined entry, may be selected from an overlapping selection menu as previously disclosed. Specific argument information can include, but is not limited to, a name, type, selectable value, and/or default value.

The information provided within any of the above identified assist windows supplies the programmer with just enough information to complete the immediate segment of a programming language statement without having to enter additional characters to complete of the programming language statement, and without having to pause and consult notes or manual pages, or to recall details, to decide what segment of the programming language statement is required next. The result is increased programmer productivity due to the accuracy and speed in which programming language statement can be produced on a first attempt. This advantage is realized for a single programmer who is generating all modules or objects of a computer program alone, and more particularly when multiple programmers are each separately generating a few modules or objects in a very large and/or complex software system where one programmer has no idea of the spelling or selection of named entities defined by another programmer.

Automated assist windows appear based on a determination of the possible choices that exist in view of the programming language statement characters and/or identifiers immediately preceding the character position cursor. A continuous high-level compilation occurs as each character in each line of programming language code is entered so that symbols, labels, and names can be instantly resolved for the immediate programming language statement whether the defined entity being referred to is a local program definition or a global library definition. Alternatively, manually invoked assist windows appear on demand based on a user request. The information displayed in an assist window is determined by first parsing the programming language string proximate to the present character position cursor. From the tokens of the parsed programming language string, the system then determines the type of programming language statement that exists, and any information that might be displayed about the immediate programming language statement! In the preferred embodiment the parsing is done as a reverse parse, however, any parsing technique can be used.

The statement generating and information tool is operable in any computing environment in the range of environments from a personal computer to a workstation and mainframe, provided that the computing environment supports a programming language compiler either directly or by way of a network connection. In a typical embodiment the computing environment is a general purpose personal computer having a windows based operating system and programming language compiler running on a typical processor that is operatively attached to a input/output devices including but not limited to a display screen, keyboard, and mouse.

SUMMARY OF THE INVENTION

The present invention generates automatically and/or manually invoked assist windows that contain information applicable to a programming language statement that is proximate to the present location of the character position cursor. The assist window information can be used to complete at least one portion of a programming language statement being constructed by the programmer. The assist window information can also be used by the programmer to obtain help that is relevant to the immediate portion of the programming language statement by supplying information relevant to the present location of the character position cursor in the immediate programming language statement. Although specific embodiments are disclosed herein, it is expected that persons skilled in the art can and will design alternative assist window systems that are within the scope of the following claims either literally or under the Doctrine of Equivalents.

BRIEF DESCRIPTION OF THE DRAWINGS

FIGS. 7, 8, and 9 illustrate a stepwise progression of informational display assist windows in screen display form;

FIG. 12 illustrates details of a commit key operation in the context of the automated assist window operational steps in flow diagram form.

DETAILED DESCRIPTION OF ILLUSTRATIVE EMBODIMENTS

Exemplary Computing Environment—

FIG. 1

Figure 1:
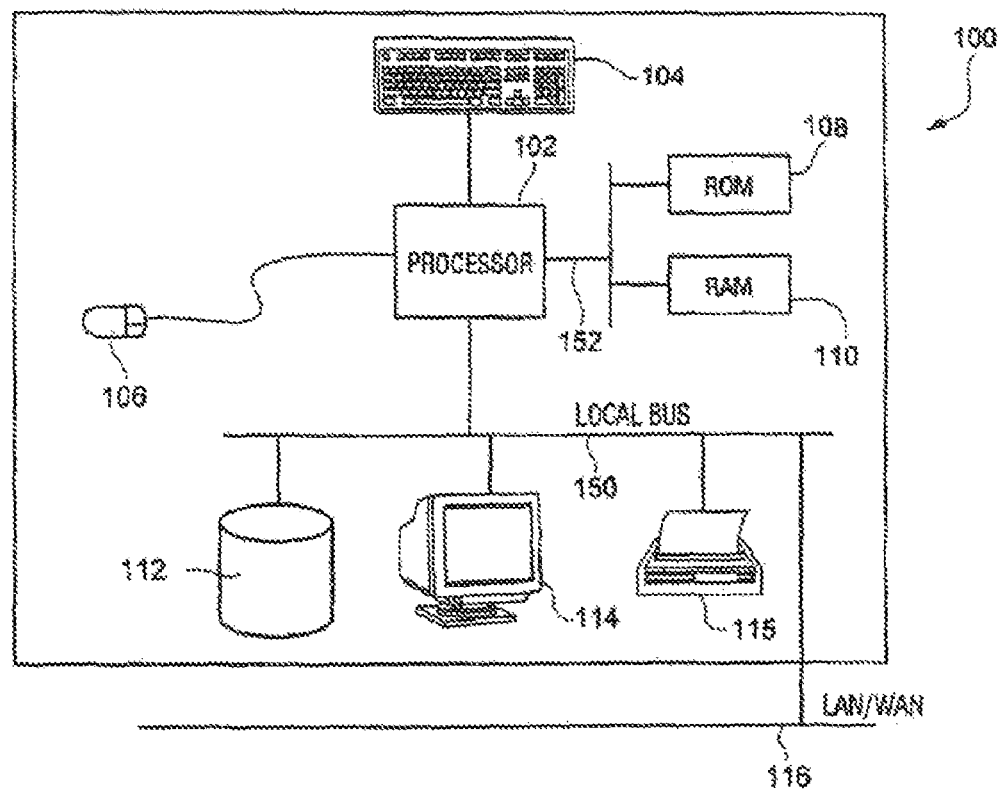
FIG. 1 illustrates a block diagram of an exemplary computing environment in which the present invention can be implemented.

FIG. 1 illustrates a block diagram example of a general purpose computer system 100 that is suitable for use with the present invention. However, the present invention is operable in any of the several computing environments that can include a variety of hardware, operating systems, and program modules that are all commercially available in the industry. Program modules include, but are not limited to, routines, programs, components, data structures, and the like that perform particular tasks and/or implement particular abstract data types. Moreover, persons skilled in the art appreciate that the invention can be practiced with other computer system configurations including, but not limited to, hand-held devices, network computers, multiprocessor based systems, microprocessor-based or other general purpose or proprietary programmable consumer electronics, minicomputers, mainframes, and the like. The present invention may also be practiced in distributed computing environments where tasks are performed by remote processing devices that are linked through communications networks. In a distributed computing environment, program modules may be located in and/or executed from local and/or remote memory storage devices.

The present invention and any other necessary programmed instructions and/or commands are executable on processor 102. Processor 102 stores and/or retrieves programmed instructions and/or data from memory devices that can include, but are not limited to, Random Access Memory (RAM) 110 and* Read Only Memory (ROM) 108 by way of memory bus 152. Another accessible memory device includes non-volatile memory device 112 by way of local bus 150. User input to computer system 100 is entered by way of keyboard 104 and/or pointing device 106. Human readable output from computer system 100 can be viewed on display 114 or in printed form on local printer 115. Alternatively, computer system 100 is accessible by remote users for purposes that can include debugging, input, output and/or generating human readable displays in printed and/or display screen output form, or any other output form, by way of a Local Area Network (LAN) or Wide Area Network (WAN) 116. Selection Menu Assist Windows—FIGS. 2-6

FIGS. 2-6 illustrate a stepwise progression of display screen snapshots for an operator embedded programming language statement that is being constructed by a programmer using a typical object oriented programming language. The type of assist window most commonly used to facilitate the construction of an operator embedded programming language statement is called a selection menu assist window. The examples discussed and/or referred to in this document are generic object oriented programming language statements. However, the present invention can be implemented within the structure of any programming language and no limitation is intended or implied by the object oriented examples herein.

A selection menu assist window itself, as with any type of assist window, is the visual user interface component that makes the present invention particularly useful to a programmer who is generating, modifying, or reviewing a computer program. A selection menu is a drop-down style window that is a common window user interface feature. A drop-down window is also known as a pop-up menu or pop-up window, and typically includes standard window features such as overflow text slide-bars, default selection highlighting, random pointing device menu manipulation and selection control, and keyboard directional arrow key menu manipulation and enter key selection control.

A selection menu assist window displays a finite list of syntactically valid menu items that are based on previously defined object entities. Each menu item in a given selection menu assist window is also only applicable to the immediate section of the programming language statement that is proximate the character position cursor on the programmer's display screen. Choosing from the finite list of menu items saves the programmer from having to independently recall the list of valid possibilities that can be used to complete an immediate section of a programming language statement. Choosing from the finite list of menu items also saves the programmer from having to manually enter each keystroke of an immediate section of a programming language statement and minimizes the chances that the programmer might inadvertently enter a typographical error into a programming language statement.

A menu item from a selection menu assist window is used to build part of a programming language statement if the menu item has been selected and committed. A menu item is said to have been selected if menu item for use in the immediate programming language statement by way of a windows based screen pointing device such as a mouse for example, or by positioning a present menu item indicator bar such as a highlight bar over the desired menu item using keyboard directional keys. Accepting a highlighted selection, also known as committing, is accomplished by engaging any one of a set of predefined commit keys such as a {Space} or {Enter} key, or the dot"." character. The set of predefined commit keys includes any character that functions as a delimiter in a programming language statement and is programming language specific. Common delimiter type commit keys can include, but are not limited to, {Enter}, {Space} and any one of the set of {.=,()+−*^<>:!}. In the context of the present invention, a commit key serves no commit function at ail if the selected menu item is not also highlighted. The assist window can be removed from view on the display screen by pressing the {Escape} key or by moving the character position cursor.

A menu item in a selection menu can also be entered into a programming language statement by anticipation typing a sufficient number of characters to uniquely correspond to only one menu item. When enough characters are entered for an exact match, the corresponding menu item is automatically used to replace the immediate section of the programming language statement when a commit key is entered. Regardless of the type of entities listed in the selection menu, a selection menu assist window is displayed in a preferred embodiment proximate to the present character position cursor location. The contents of a selection menu assist window is determined by reverse parsing and/or continuous partial compiling of the existing program and that portion of the programming language statement fragment that precedes the character position cursor.

Figure 2:
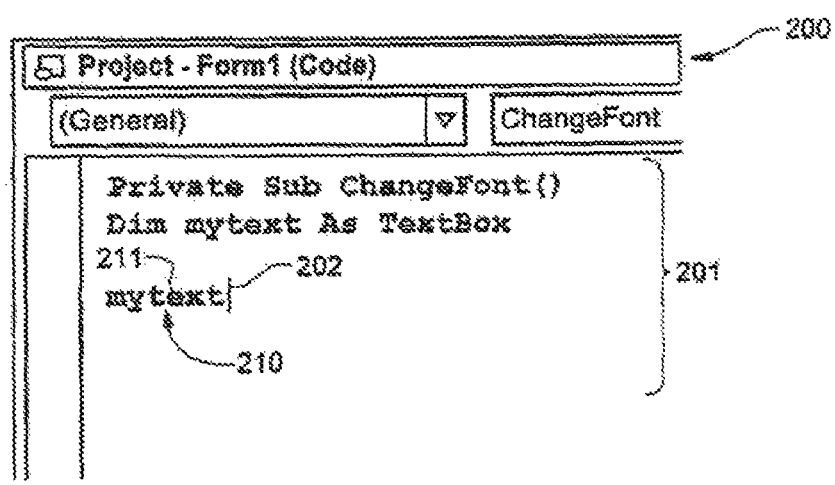
FIGS. 2, 3, 4, 5, and 6 illustrate a stepwise progression of selection menu assist windows in screen display form.

FIG. 2 illustrates an example of a programming language edit display window 200 as it might appear at time T1 on the display screen of a personal computer. For purposes of this example, assume that a programmer is writing a computer program comprised of programming-language statements 201 that, among other things, define an object having the name mytext as a standard TextBox type supported by the programming language. The object of the present discussion is the programming language statement 210 that begins with the member name mytext 211. The operational purpose of programming language statement 210 is to change the font of the object mytext 211 into underlined text. FIG. 2 illustrates the time when the programmer has typed the characters mytext 211 in the programming language statement 210 so that the character position cursor 202 is at the character position following the last character of mytext 211.

Figure 3:
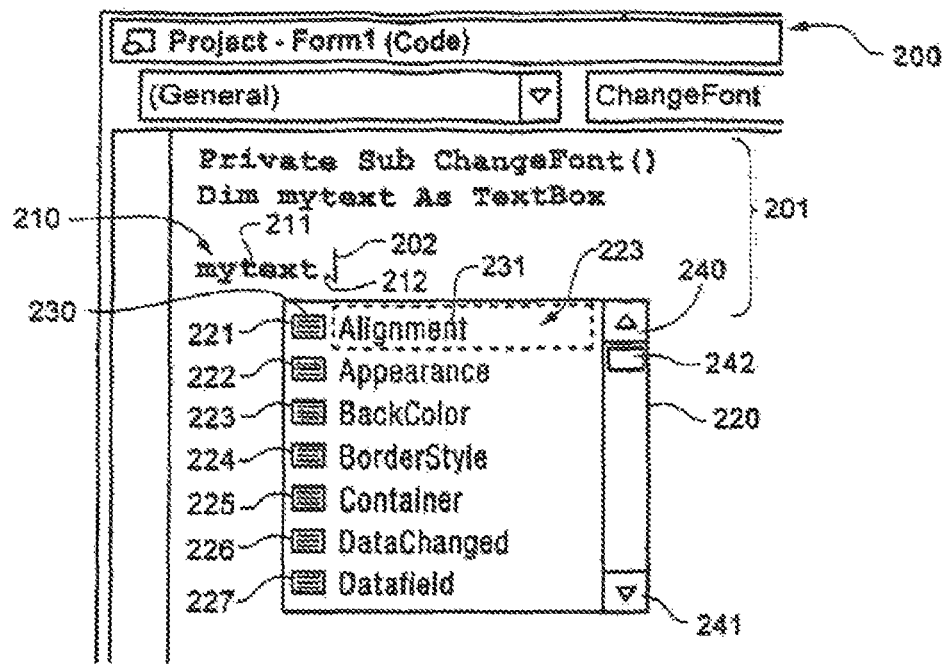

FIG. 3 illustrates the programming language edit display window 200 from FIG. 2 at a new time T2. At time T2 the programmer has typed the member access separator character 212, in the present case the dot "." character, following the last character of the object name mytext In response to typing the member access separator character 212, the statement building tool of the present invention determines the set of menu items that correspond to the object type mytext and a selection menu assist window 220 is displayed proximate the present character position cursor 202. The selection menu assist window 220 contains a set of menu items 221-227, any one of which can be validly included in the present programming language statement at the immediate location of character position cursor 202. Each of the set of menu items 221-227 has a member type, such as a property member type, a method member type, or a constant member type. The member type for a given menu item is identified by a bitmap that is adjacent to the menu item. For menu item 221 for example, there exists a bitmap 230 and a member name 231 of Alignment. The member type for each of the set of menu items 221-227 in the FIG. 3 example are all a property type. The member name 231 is the present menu item as identified by the present menu item indicator 223. The present menu item indicator 223 notes the present menu item from among the set of visible menu items 221-227 by a broken line enclosure.

The programmer can scroll through the set of menu items 221-227 using either the standard keyboard directional keys {Up}, {Down}, {Page Up}, and {Page Down}, or by using the window scroll buttons 240-241 and/or scroll bars 242. Note that the selection menu assist window 220 is only large enough to display the set of menu items 221-227 and that the purpose of the scroll feature is because at least one more menu item might exist outside the immediate view of the present window and the menu items must be scrolled up or down to see any out-of-view menu items. Committing one of the set of menu items 221-227 is accomplished by pressing the {Control-Enter} or {Tab} keyboard keys when the desired menu item is highlighted, or by double clicking the desired menu item using the selection button on a screen pointing device. In either case, the selected menu item is inserted into the programming language statement 210 from the present location of the character position cursor 202. Any text between the last delimiter and the character position cursor is replaced by the menu item.

Figure 4:
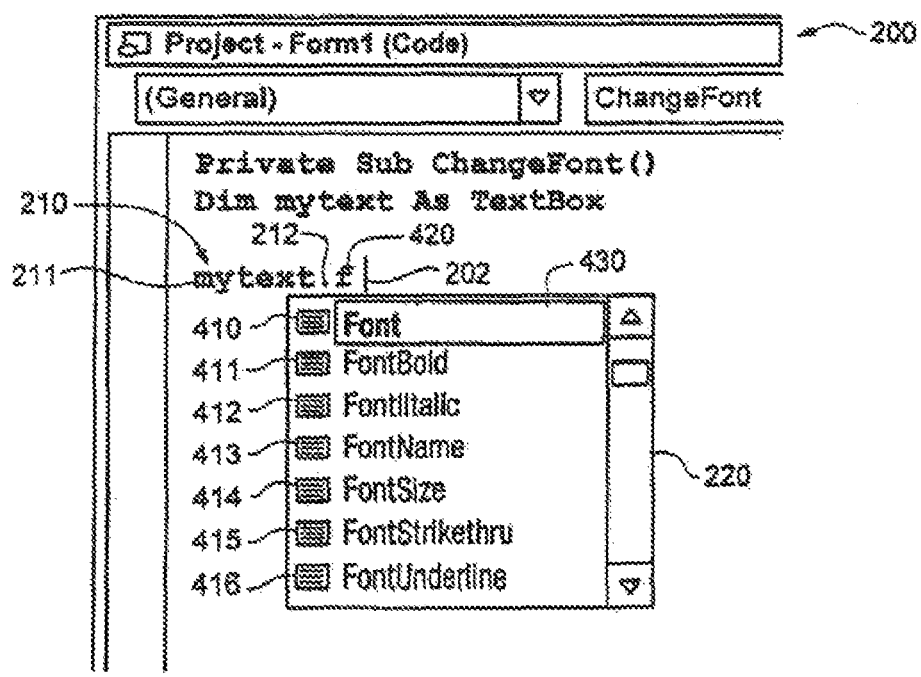

FIG. 4 illustrates a second set of previously out-of-view menu items 410-416 at a time T3 within selection menu window 220. The previously out-of-view menu items 410-416 are revealed by either the traditional scrolling methods as previously disclosed, or by anticipation typing as disclosed below. Anticipation typing is useful in the situation where the programmer knows the name or at least the first character of the desired menu item and causes the desired menu item to "scroll" into view by typing at least the first character of the desired menu item.

Starting from FIG. 3, the programmer can view the set of menu items 221-227 in selection menu assist window 220. Without moving from the traditional touch typing hand position, the programmer can enter the character T 420 at the present character position cursor location 202, which results in an automatic search of the complete set of menu items 221-227 and 410-416 to locate the first menu item in the alphabetic list that begins with the character "f1 420 otherwise no scrolling occurs. FIG. 4 illustrates the result of the automatic search.

The highlighted menu item 410 is the first menu item in the complete set of menu items that begins with the character "f" 420. Although there are other menu items 413-416 that begin with the same character, only the first in the list is highlighted. The highlighted menu item 410 is the selected menu item that can be committed as previously disclosed by pressing a commit key such as the {Ctrl-Enter} or {Tab} key or any other designated commit key. If the commit key is a delimiter character, then the commit key is included as part of the programming language statement in addition to committing the menu item. A non-delimiter commit key is not included as part of the programming language statement. A selected menu item can also be committed by double clicking the select key on a mouse while the directional screen pointer is pointing to the desired menu item. The set of designated commit keys can vary from programming language to programming language and can include, but is not limited to, any keyboard key or combination of keys. Commit keys can also be special characters. For example, commit keys in a Visual Basic programming language can include the {Enter} and {Space} keys in addition to any one of the characters in the set of delimiter type commit keys such as {.=,()+−**<>:! and .}. Pressing a delimiter type commit key when a menu item is not highlighted does not select the menu item. In other words, the input focus of a selection menu assist window 220 is only active when a menu item is highlighted. For this reason, the programmer can proceed to "type through" the presence of the selection menu assist window 220 without taking advantage of or experiencing interference from an assist window. A lowlighted menu item is one that is outlined or otherwise distinguished from ordinary text to indicate a present menu item, but not a selected or committed menu item. A highlighted menu item is a selected menu item that is significantly distinguished from the hue or intensity of a lowlighted item.

If the highlighted menu item 410 is not the desired menu item, the programmer has the choice of either scrolling through the menu items near the highlighted menu item 410, or the programmer can type additional characters at the character position cursor 202 until a sufficient number of characters exist to force the statement building tool to automatically select the desired match. Once a menu item is selected, the selected menu item is inserted into the programming language statement 210, replacing any anticipation typed characters that exist at the character position cursor 202. The selection menu assist window 220 then disappears from the programming language edit window 200. Alternatively, the selection menu assist window 220 can be removed from the programming language edit window 200 at any time by pressing the {Escape} keyboard key or by horizontally moving the character position cursor.

If the statement building tool does not identify an exact menu item match from the anticipation typed characters input by the programmer, then the resulting narrowed list of menu items assist the programmer in quickly identifying and selecting the desired menu item by way of the scrolling and selection methods previously disclosed. However, the best alphabetic match can be committed by pressing the {Ctrl-Enter} or {Tab} keyboard keys. For example, if the programmer had typed the characters fontbl as the anticipation typing characters in programming language statement 210 of FIG. 4, the selection menu assist window 220 would scroll to and lowlight select menu item 411 FontBold as the present menu item having the best available alphabetic match. The present menu item 411 can then be committed by pressing a non-delimiter commit key such as the {Tab} keyboard key. A delimiter type commit key can not be used because the present menu item is a lowlight selection and a commit by way of a delimiter character requires a highlight selected menu item. Requiring the highlighted selection requirement facilitates the programmer's ability to type-through any assist window.

Figure 5:
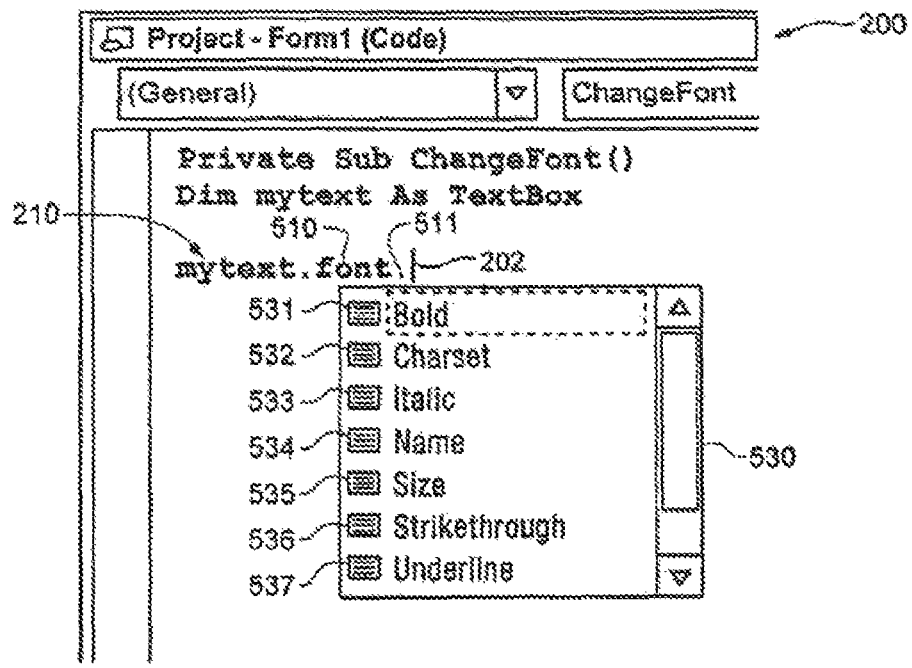

FIG. 5 continues the present example at a time T4 by assuming that the programmer has used the delimiter commit key dot"." 511 to accept the menu item Font 510 into programming language statement 210. Thus at time T4, the statement building tool automatically determines by way of continuous partial compiling, that the incomplete programming language statement mytextfont is an object of the Font type and that a second selection menu assist window 530 is required to display a new set of menu items 531-537 that correspond to the previously defined Font type object. The programmer can select one of the set of menu items 531-537 in a manner as previously disclosed in the text accompanying FIG. 4.

Figure 6:
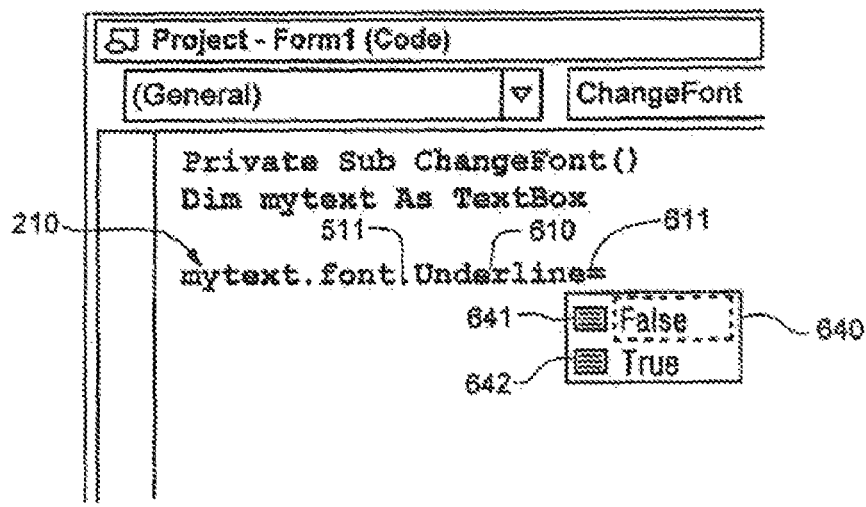

FIG. 6 illustrates that Underline 610 was committed as part of programming language statement 210 by using the delimiter commit key equal "=" 611. Once the programming language statement 210 is completed up to the present character position cursor location 202 in FIG. 6, the statement building tool once again automatically determines by continuous partial compiling that the incomplete programming language statement mytext.font.underline=resolves to a Boolean data type and that a third selection menu assist window 640 is required to display the list of valid menu items 641-642 for this data type. In the present case the only Boolean choices that can be used to complete the programming language statement 210 are either true 641 or false 642. The desired menu item 641 or 642 can be committed as part of programming language statement 210 in the manner previously disclosed in the text accompanying FIGS. 4-5.

Without using the statement building tool to help generate a complete programming language statement such as mytext.Font.Underline^True, the most efficient programmer can only complete the statement by accurately typing at least about 26 keystrokes while remembering the selection, order, and syntax of the available property types. However, using the statement building tool to help generate a complete programming language statement such as mytext.Font.Undertine=True, a programmer need only type at or about 12 keystrokes and remember or otherwise look up almost none of the selection, order, and/or syntax of the available property types needed to complete the programming language statement. Not only are fewer keystrokes required, the programmer can selectively use whichever of the unobtrusive assist windows containing real time reminders relevant to each keystroke to quickly further the immediate programming language statement toward error free completion.

The statement building tool can be customized by the programmer to include any type and/or scope of program information that would be useful to the programmer. Typically, it is most desirable to limit the type and/or scope of program information that the statement building tool includes in any one assist window so that the programmer is not overwhelmed with information. For example, the types of program information that can be included in any one assist window include, but are not limited to, global variables, global functions, and global constants that may each be used from any procedure or module in a multi-module program. In addition, there are variables, functions, and/or constants that are only available or local to a given program procedure or module. Depending on the scope of the program being completed by the programmer, the programmer might want to limit the available assist window information to certain combinations of global, local, and/or sub-local variables, functions, and/or defined constants. Additional-assist window information might include, but not be limited to, local or global structure or label names, conditional compilation constants within #IF and #Elself structures, lists of classes with implementable interfaces, event names, the subset of all types having event interfaces, the subset of all types themselves, and/or the names and/or types that are used to qualify a type. Informational Display Assist Windows—FIGS. 7-9

Figure 7:
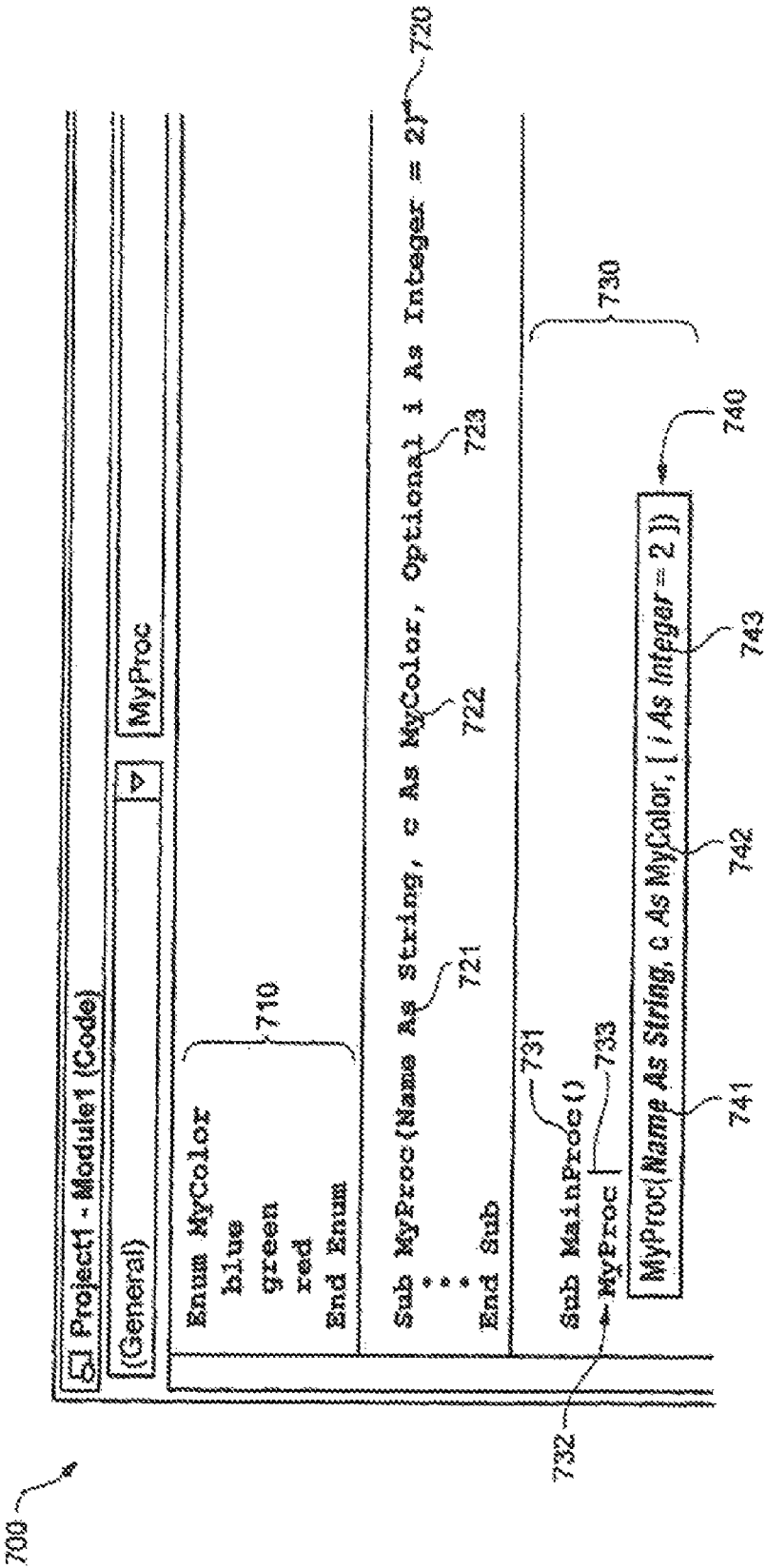
Figure 8:
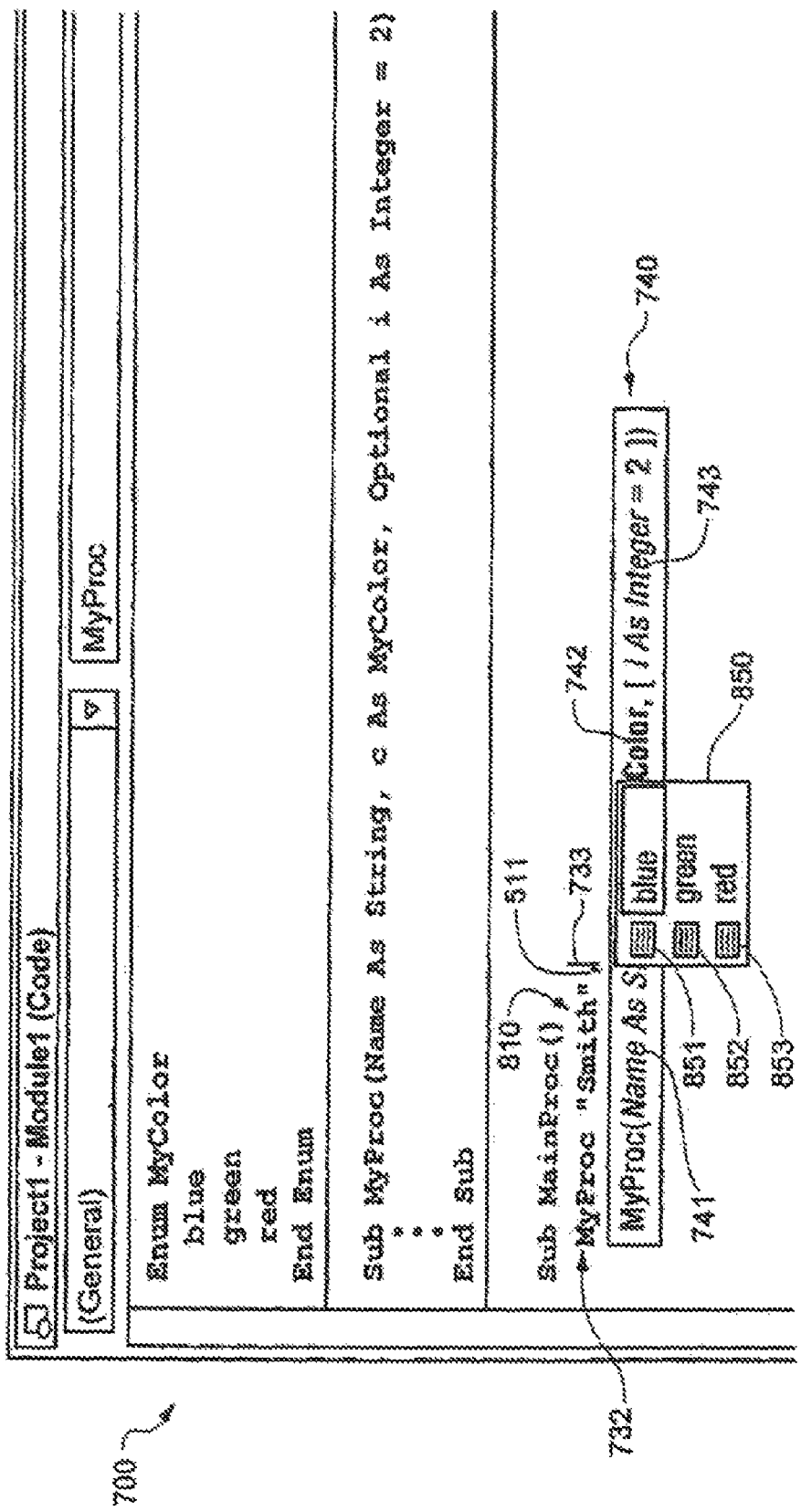

FIGS. 7-9 illustrate an exemplary progression of an informational display assist window as it would appear during construction of a procedure call argument list. Other miscellaneous types of program information can be displayed by informational display assist windows as is disclosed in the text accompanying FIGs. Xxx.

FIG. 7 illustrates an edit display screen 700 that contains numerous programming language statements 710, 720, and 730 at a time T1. The programming language statements 710 declare an enumerated Enum type of property or method MyColor having three members including blue, green, and red. Programming language statement 720 declares a procedure of type MyProc having three arguments 721-723 that comprise an argument list. The first argument 721 is a mandatory argument String, the second argument 722 is a mandatory argument MyColor, and the third argument 723 is an optional argument Integer as noted by the square bracket enclosure. The optional argument Integer includes a default value of 2.

The programming language statements 730 are the body of a procedure called MainProc that begins at programming language statement 731. In response to the programmer typing MyProc as the first characters of programming language statement 732 the statement building tool automatically identifies MyProc as a previously declared procedure call. In response to identifying the procedure being called, the statement building tool generates an informational display assist window 740 containing the corresponding argument list for the called, procedure. In addition, the statement building tool of the present invention highlights the argument that corresponds to the present position of the character position cursor 732 within the argument list.

In the FIG. 7 example, the first argument 741 in informational display assist window 740 is highlighted so that the programmer is automatically reminded of the type, order, and details of the argument within the argument list. Displaying the entire argument list, the present argument in highlighted form, and the details of each argument all within a single assist window is key to assisting the programmer toward quickly and accurately completing a procedure call type programming language statement. Displaying the argument list and highlighting the present argument eliminates the need for the programmer to look up or remember the order, type, syntax, or substantive details of any argument. In alternative embodiments an optional argument can be noted by a distinguishing color or font type or any other distinguishing indicia other than square bracket enclosures.

FIG. 8 illustrates procedure call 732 at time T2 with a first argument value Smith 810 already in place. Note that in the present example the first argument 741 is a string type and because no previously declared values exist for this argument, the programmer must have manually typed the desired character string Smith. Pressing the Comma "," 811 commit key following the value Smith causes an update in the informational display assist window 740 so that the second argument 742 is highlighted to indicate the present location of the character position cursor 732 within the argument list. Because the second argument 742 is a defined type comprised of three color members, a selection menu assist window 850 is generated and overlaid on the informational display assist window 740. The selection menu assist window 850 contains three menu items 851-853 that the programmer can choose from to complete programming language statement 740 in a manner as previously disclosed in the text accompanying FIGS. 2-6. The selection menu assist window 840 is designed to disappear once a menu item is committed or the Escape key is pressed.

FIG. 9 illustrates a time T3 where the second argument value blue 910 has been committed by using the Comma "," 911 commit key. The result of committing a value for the second argument 742 is that the assist window 740 is updated so indicate that the third argument 743 corresponds to the present location of the character position cursor within the argument list being constructed in the procedure call 732. The third argument 743 is optional as indicated by the square brackets in the present example. A value for an optional argument can be committed or ignored as determined by the programmer. In the present example, because the third argument 743 has a default value "2", ignoring or failing to provide a value will result in the default value of "2" being used. However, if an alternative value is manually entered as in the present example where the value "5" is entered as the argument value 912, then the manually entered value is used in the procedure call 732. When values for each argument in procedure call 732 are present at a time T4, the informational display assist window 740 disappears.

Note that not only can a selection menu assist window overlay an informational display assist window as illustrated in FIG. 8, a second informational display assist window can overlay a first informational display assist window if one of the arguments in the first procedure call is itself a procedure call. As a value or menu item is committed or otherwise entered for each level of nested calls, the last active assist window is replaced with the next. level of assist window. The number of nesting levels and/or combinations of assist windows are limited only by the programming language itself.

Another general use of an informational display assist window is when a programmer returns to a previously completed programming language statement and places the character position cursor somewhere within the programming language statement. By manually requesting information about the object entity on which the character position cursor rests, the statement building tool will display any information that is relevant to that point in the programming language statement. For example, if it is desirable for a programmer to review the value of a defined constant that is being used in a given programming language statement, then all the programmer must do is place the character position cursor within the characters of the defined constant and the constant's defined name and value are be displayed in an informational display assist window. The statement building tool can determine the value of the defined constant by partial compilation. The statement building tool can determine that the object is a defined constant by reverse parsing the programming language statement.

Another use of an informational display assist window is to manually request a display of the menu items for an object entity within a programming language statement. A new menu item can be committed if desired to modify the programming language statement.

Operational Steps—FIGS. 10-13

Figure 10:
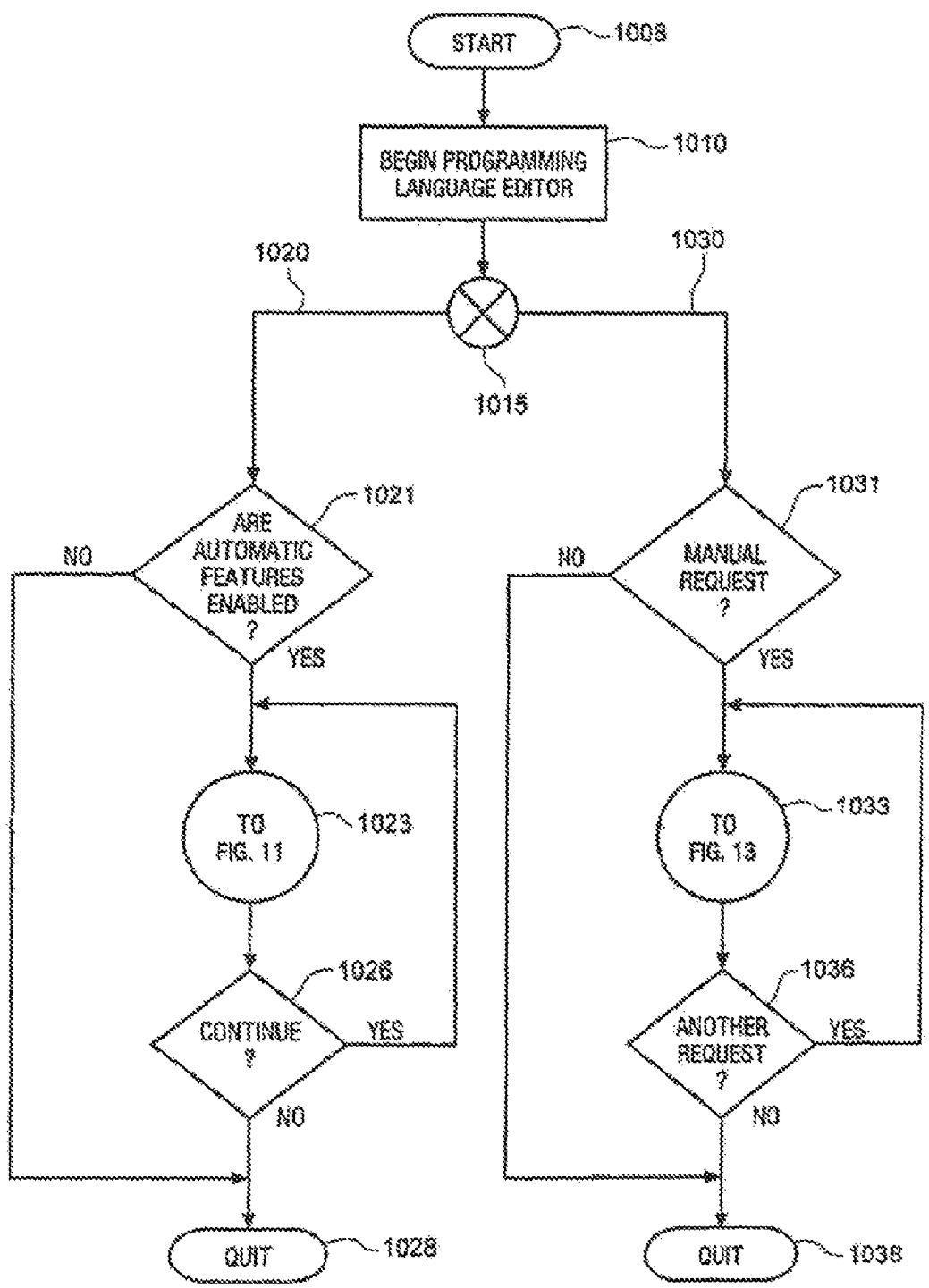
FIG. 10 illustrates an overview of the assist window operational steps in flow diagram form.
Figure 11:
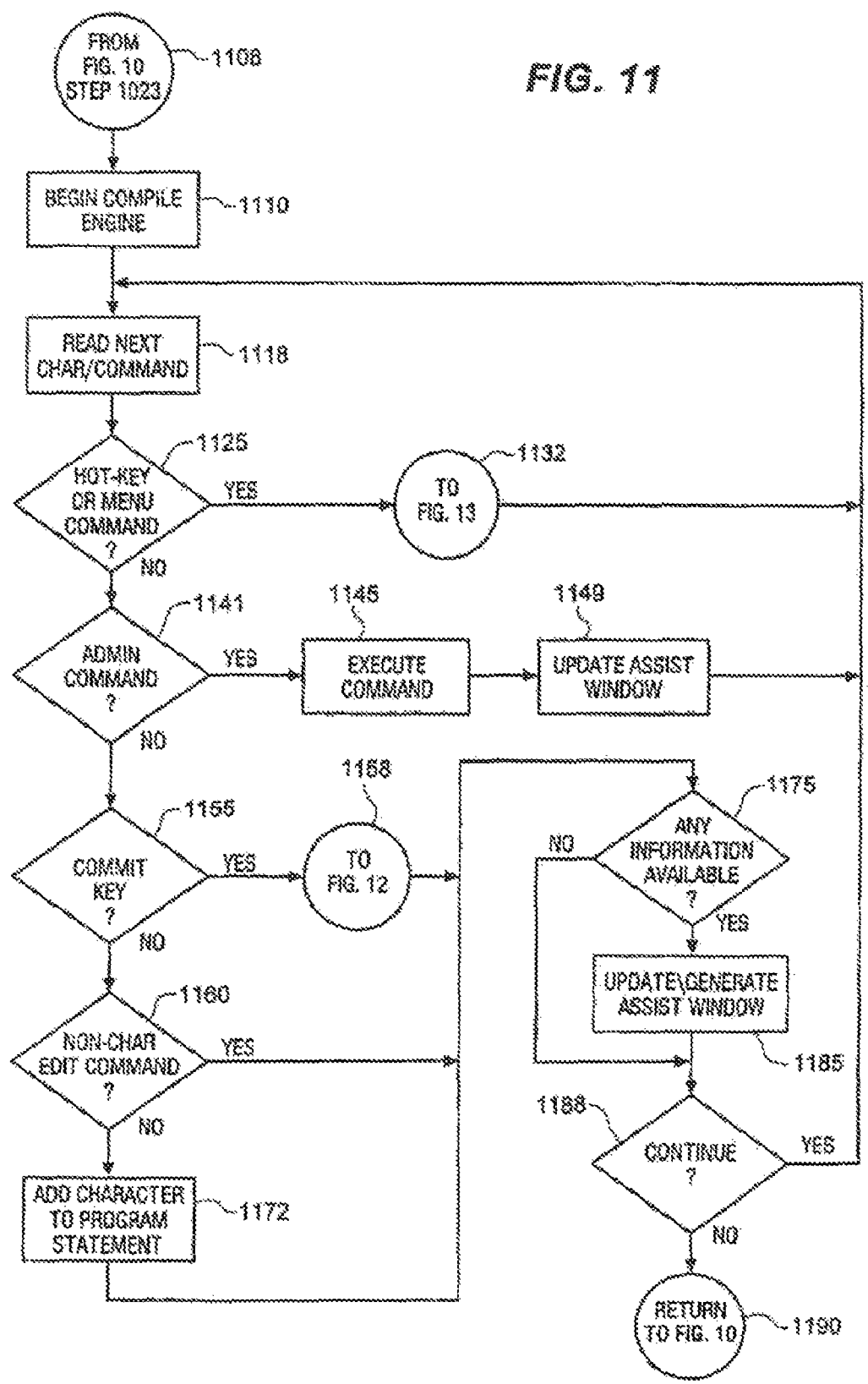
FIG. 11 illustrates an overview of the automated assist window operational steps in flow diagram form.
Figure 13A:
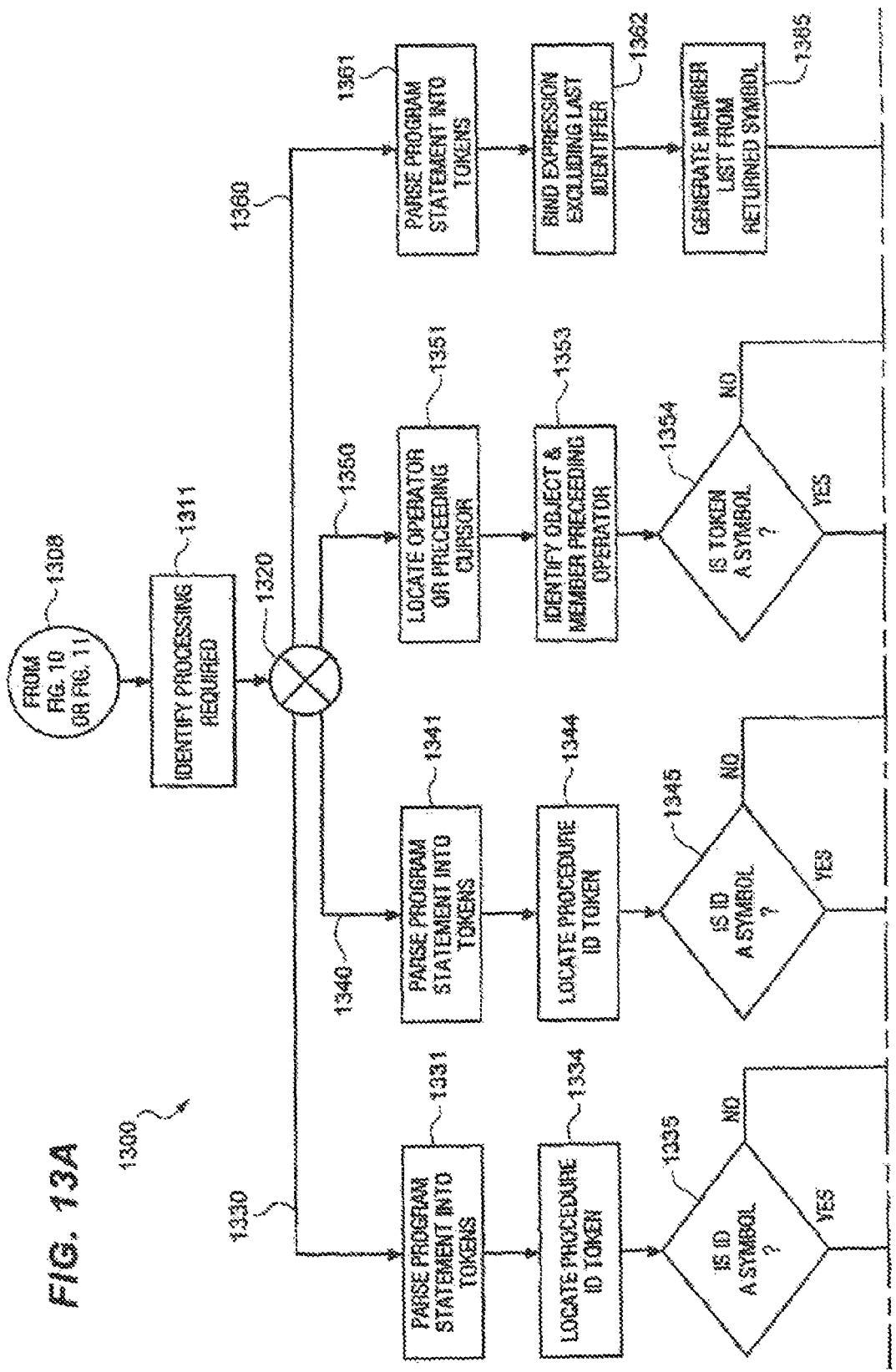
FIGS. 13A and 13B illustrate an overview of the manually requested assist window operational steps in flow diagram form.
Figure 13B:
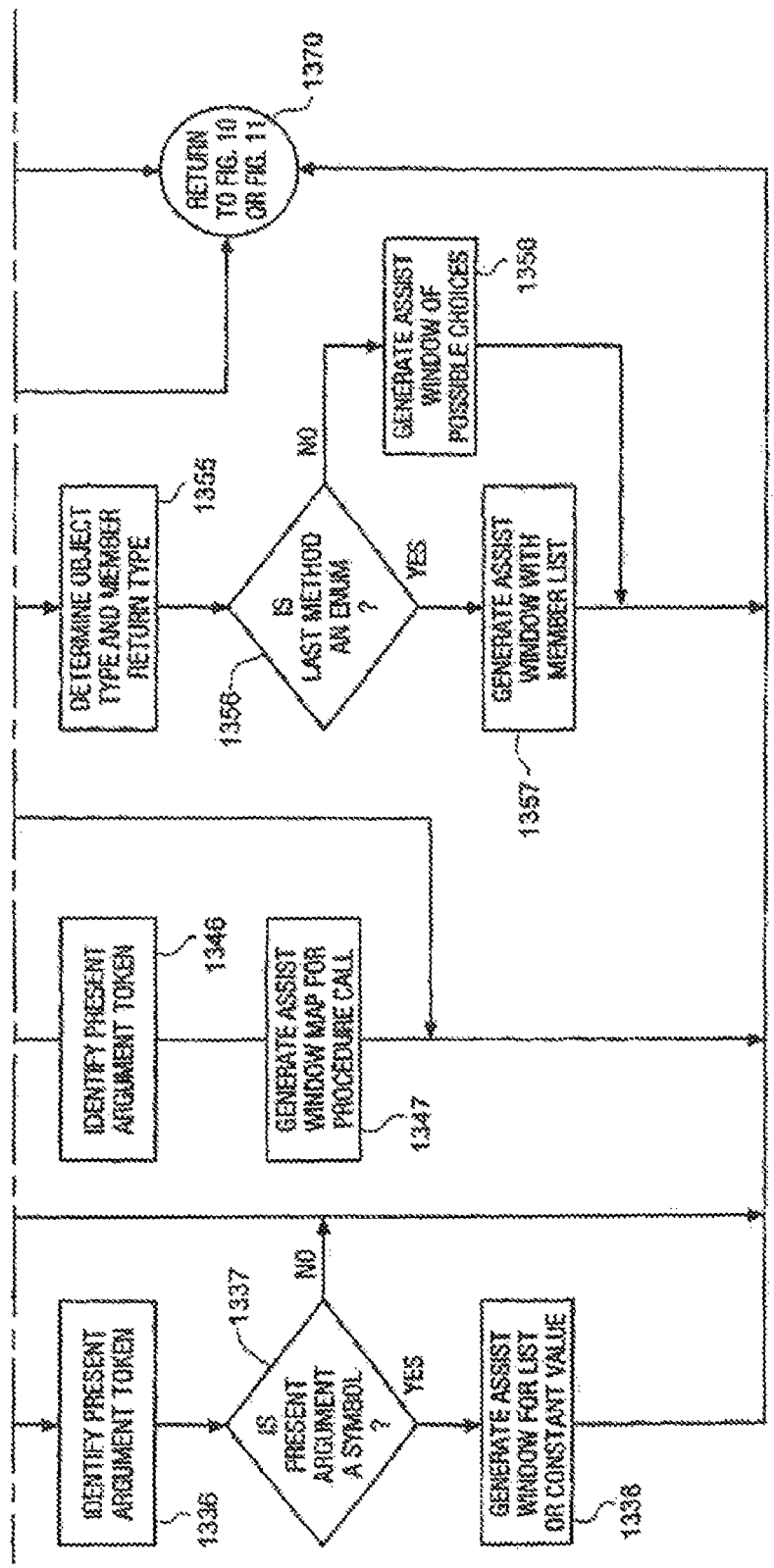

FIGS. 10-13 illustrate the operational steps in flow diagram form for the statement generating and statement information tool. Specifically, FIG. 10 illustrates the statement generating tool overview in flow diagram form. FIG. 11 illustrates details of the automatic statement generating operational steps in flow diagram form. FIG. 12 illustrates details of commit key operational steps in flow diagram form. FIG. 13 illustrates details of manually requested assist window displays in flow diagram form.

The FIG. 10 overview starts at step 1008 and proceeds to step 1010 where the statement building tool initializes a programming language editing tool for use by the programmer. The programming language editing tool is a windows based application that has a multitude of user customizable operational options that each have a default setting if not modified by the user. The threshold option is whether the statement building tool's automatic operation feature is enabled or disabled. The operational options can include, but are not limited to, running the statement building tool with the automatic mode enabled or disabled, and defining custom hot-key combinations for manual statement building tool requests.

The automatic and manual features of the statement generating tool are accessed from branch point 1015 way of branches 1020 or 1030 respectively. Both the automatic and manual features can be activated and/or inactivated at any time by entering available hot-key or menu selection commands. Further, the automatic and manual features are not mutually exclusive and can therefore be used independently from each other or simultaneously with each other.

On the automatic feature branch 1020, if it is determined at decision step 1021 that the automatic statement building features are inactive, then no automatic statement building activities will occur and processing continues at step 1028. Alternatively, if it is determined at decision step 1021 that automatic statement building features are activated, then the automatic features begin their continuous statement building processes at step 1023. Details of the automatic statement building operational steps are disclosed in the text accompanying FIG. 11.

If at decision step 1026 it is determined that it is desirable to inactivate the automatic features of the statement generating tool then the automatic features of the statement generating tool quit operating at step 1028. Alternatively, if it is determined at decision step 1026 that the automatic features of the statement generating tool will continue operating, then the automatic statement building tool remains active and processing continues at step 1023.

On the manual feature branch 1030, if it is determined at decision step 1031 that no manual statement building features are requested by the user, then processing continues at step 1038 without any action taken. Alternatively, if it is determined at decision step 1031 that manual statement building features are requested, then the requested manual feature is activated at step 1033. Details of the manual statement building operational steps are disclosed in the text accompanying FIG. 13.

If at decision step 1036 it is determined that no additional manual statement building requests exist, then the manual features of the statement generating tool quit operating at step 1038. Alternatively, if it is determined at decision step 1036 that additional manual statement generating tool requests exist, then manual statement building tool request processing continues at step 1033.

FIG. 11 illustrates the details of the automatic statement building operational steps from step 1023 of FIG. 10. Processing begins at step 1108 and proceeds to step 1110 where the automatic statement generating tool features are initialized and the tool begins a continuous symbol-level compilation of programming language statements that already exist and/or are being entered in real time. A symbol-level compilation is a high level compilation that resolves symbols, labels, aliases, and the like, but does not compile the programming language statements to the extent of generating machine executable object code. The purpose of a continuous-symbol-level compilation is to facilitate the real time availability of a set of object entities and/or other program related information that is based on previously defined programming language statements, global symbols, accessible libraries, and/or other linked modules.

At step 1118, the statement generating tool waits for and reads the next character or command that is input by the user. A character includes any alphabetic, numeric, or special character that is part of a programming language statement. A command may be a character that is entered in a specific contextual situation, an administrative or window manipulation command, or a substantive feature command. Processing the input commands and/or character input comprise the remainder of the FIG. 11 operational steps.

If it is determined at decision step 1125 that a substantive statement generating tool feature command has been entered, then processing continues^ at step 1132. A substantive statement generating tool feature command is a programmer initiated request for a statement generating tool feature that can include, but is not limited to, a manually requested or ondemand assist window for a randomly selected programming language statement. Manual requests for statement generating tool features can be entered by way of a hot-key or command menu input. Hot-key commands can include any character or keystroke combination such as for example, {Ctrt-J}, {Ctrt-Shift-J}, {Ctrl-1}, {Ctrl-Shift-1}, and {Ctrl-Space}. The operational de manual statement generating tool feature requests are disclosed in the text accompanying FIG. 13. Once step 1132 processing is complete, processing continues at step 1118 as previously disclosed. Alternatively, if it is determined at decision step 1125 that the input received in step 1118 is not a substantive statement generating tool command, then processing continues at step 1141.

If it is determined at decision step 1141 that the input received in step 1118 is an administrative or window manipulation command, then processing continues to step 1145 where the command is interpreted and executed. At step 1149 the subject assist window and/or programming language editor window is refreshed as needed in response to executing the command, and processing continues at step 1118 as previously disclosed. Examples of administrative or window manipulation commands can include, but are not limited to, window navigation keys such as {Up}, {Down}, {PageUp}, {PageDown}, {Ctrl-PageUp}, {Ctrl-PageDown}, and {Escape}. Alternatively, if it is determined at decision step 1141 that the input received at step 118 is not an administrative or window manipulation command, then processing continues to step 1155.

If it is determined at decision step 1155* that the input received in step 1118 is a commit key, then processing continues to step 1158 where the commit key is appropriately processed. After step 1158, processing continues at step 1175. Operational details of processing commit keys and the commit scenarios, are disclosed in the text accompanying FIG. 12. Alternatively, if it is determined at decision step 1155 that the input received in step 1118 is not a commit key, then processing continues at step 1160.

If it is determined at decision step 1160 that the input received in step 1118 is a non-character text editing command, then processing continues to step 1175. A non-character text editing command can include, but is not limited to, {Cut}, {Copy}, {Paste}, {Undo}, {Redo}, {Delete}, and {Backspace}, for example. Alternatively, if it is determined at decision step 1160 that the input received in step 1118 is any other substantive input character, then processing continues at step 1172. At step 1172 the substantive input character is passed to the programming language editor where the character is added to the present programming language statement at the present character position cursor location.

If it is determined at decision step 1175 that a presently displayed assist window requires modification in view of the character most recently input at step 1118 or that a new assist window is required in view of the character most recently input at step 1118, then processing continues at step 1185 where the appropriate assist window modification and/or assist window generating is executed in a manner as disclosed in text accompanying FIG. 13. Examples of assist window updates can include, but are not limited to, removing an assist window, or scrolling a menu item list in a menu selection assist window in view of a new character that further alphabetically identifies an object entity being typed by the programmer. Examples of the need for a new assist window can include, but are not limited to, where no assist window was possible based on input information preceding the present input character, or where a replaced assist window is now appropriate. Note that certain of the substantive input characters that are processed at decision step 1175 will force an automatic attempt by the statement building tool to modify or generate an assist window in the same manner as if the programmer had manually requested a statement generating tool feature by way of a command as-identified in decision step 1125.

Thus whether responding to a manual or automatic command input, the statement generating tool executes substantially the same internal steps toward the end of modifying or generating an appropriate assist window. The set of automatic trigger characters that can force the automatic updating or generating of an assist window are typically programming language dependent and can be similar to or a subset of the set of commit keys previously discussed. The set of automatic trigger characters can include, but are not limited to the set of {Space,=.( )+−*/< >}. Alternatively, if no modifications or new assist windows are required, then processing continues at step 1188.

If it is determined at decision step 1188 that automatic statement generating tool processing should continue, then processing continues at step 1118 where the system waits for another input character. Alternatively, if it is determined at decision step 1188 that no further automatic statement generating tool processing should continue, then processing continues at step 1190.

FIG. 12 illustrates the operational steps 1200 for committing an item from an assist window. The operational steps 1200 begin at step 1205 and are the details of step 1158 from FIG. 11. At step 1208 the selected menu item is committed. Committing a menu item results in replacing the word segment proximate the character position cursor with the selected menu item from the assist window and the assist window is removed. If it is determined at decision step 1210 that the input character from step 1118 of FIG. 11 is a non-delimiter type commit key for a present assist window item that was not a selected item, then processing continues at step 1220. Examples of a non-delimiter type commit key can include, but are not limited to, {Tab}, and {Ctrl-Enter}. An example of a present assist window item that is not also a selected item, is a lowlighted or broken-outline menu item in a menu selection assist window that is not highlighted. A highlighted menu item indicates that the menu item is not only the present menu item but also the selected menu item. At step 1220, the commit key that precipitated the immediate commit operation is discarded because it is not the type of character that is added to the programming language statement itself. Processing then continues at step 1250.

Alternatively, if it is determined at decision step 1210 that the input character from step 1118 of FIG. 11 is a delimiter type commit key, then processing continues at step 1240. Examples of a delimiter type commit key can be programming language dependent and include, not be limited to, {{Space} {Enter},( )+−*/=<>!A.}. An example of a present assist window item that is also a selected item, is a highlighted menu item in a menu selection assist window. A highlighted menu item indicates that the menu item is not only the present menu item but also the selected menu item. At step 1240, the commit key itself is inserted into the programming language statement immediately following the previously inserted assist window item of step 1208.

If it is determined at decision step 1250 that new information exists that is relevant to the next segment of the programming language statement, then processing continues at step 1258 where the new information is displayed in an update to a presently displayed assist window or in a newly generated assist window. Alternatively, if it is determined at decision step 1250 that no new information exists that is relevant to the next segment of the programming language statement, then processing continues at step 1254 where the presently displayed assist window is removed. In either case, processing continues at step 1260 by returning to step 1132 of FIG. 11.

FIG. 13 illustrates the operational steps 1300 for processing a manual assist window request. The operational steps 1300 begin at step 1308 and are the details of step 1033 from FIG. 10 and step 1132 of FIG. 11. The assist window processing disclosed in text and FIG. 13 is substantially similar for the automatic assist window processing as for the manually requested assist windpw processing. At step 1311, the type of processing required to satisfy the automated needs or the request made by the programmer identified by the hotkey combination used or other menu command selection. The type of processing required is directed to the appropriate processing steps at branch point 1320 by way of branches 1330,1340, 1350, and 1360.

The operational steps on branch 1330 process informational menu assist window requests. In particular, branch 1330 processes the type of request that generates information relevant to a specific argument in a procedure call argument list. At step 1331 the programming language statement identified by the present location of the character position cursor is parsed into tokens. Any parsing technique can be used to identify the tokens in the programming language statement, however, in a preferred embodiment a reverse parsing technique is preferred. Specifically, the end of the word at the present character position cursor location is identified and referred to as the extended insertion point. The beginning of the programming language statement is identified at the opposite end of the programming language statement from the extended insertion point. All characters beyond the extended insertion point are ignored. Each segment of the programming language statement and each delimiter therebetween, are parsed into tokens. In the preferred embodiment, the order of the resulting token list is then reversed for further processing.

The token representing the procedure identifier for the programming language statement is located at step 1334 by examining each token in the token list. If it is determined at decision step 1335 that the procedure identification token is not a symbol that can be resolved, then processing continues at step 1370. Alternatively, if it is determined at decision step 1335 that the procedure identification token is a symbol that can be resolved, then processing continues at step 1336.

At step 1336, the present argument token that is identified by the present character position cursor is located. If it is determined at decision step 1337 that the present argument token is a symbol or other object entity that can be resolved, the processing continues at step 1338. At step 1338, context of the present argument token is determined by invoking the compiler to bind against the set of known symbols and/or object entities, and an assist window is generated to display the information relevant to the present argument token. The assist window may be a selection menu assist window or informational menu assist window as appropriate. Processing then continues at step 1370. Alternatively, if it is determined at decision step 1337 that the present argument token is not a symbol or other object entity that can be resolved, then processing continues at step 1370 because a default informational menu assist window that contains the procedure call argument list is all that can be displayed.

The operational steps on branch 1340 illustrate the steps for processing a manually requested procedure call argument list. The steps are substantially similar to the steps of branch 1330. However, the primary purpose of the branch 1340 steps is to generate a complete argument list regardless of the present location of the character position cursor within the programming language statement. Specifically, at step 1341 the programming language statement identified by the present location of the character position cursor is parsed into tokens. Central to the parsing of step 1341 is that not all procedure calls conveniently include parenthesis around the argument list as in call procedure-name (arg1, arg2). A procedure call can also take the form of procedure-name arg1, arg2. For this reason, each token must be parsed and individually evaluated to accurately identify the procedure and its argument list.

The token representing the procedure identifier for the programming language statement is located at step 1344 by examining each token in the token list. If it is determined at decision step 1345 that the procedure identification token is not a symbol that can be resolved, then processing continues at step 1370. Alternatively, if it is determined at decision step 1345 that the procedure identification token is a symbol that can be resolved, then processing continues at step 1346.

At step 1346, the present argument token that is identified by the present character position cursor is located. The information obtained in steps 1341-1346 provide the procedure call name, the argument list, and the present argument that is highlighted to correspond with the present location of the character position cursor within the programming language statement. At step 1347, the compiler is invoked to bind against the set of known symbols and/or object entities for the argument list and an assist window is generated to display the information relevant to the procedure call and the present argument. Processing then continues at step 1370.

The operational steps on branch 1350 illustrate the steps for processing a manual request for an assist window that contains assignment information. Assignment symbol information includes, but is not limited to, symbols or constant lists that can validly follow the assignment symbol itself or any other arithmetic operator for example. At step 1351 the nearest operator is located that immediately precedes the present location of the character position cursor.

At step 1353, the object and member name token combination is identified that immediately precede the operator identified in step 1351. If it is determined at decision step 1354 that the token combination is not a symbol that can be resolved, then processing continues at step 1370. Alternatively, if it is determined at decision step 1354 that the token combination is a symbol that can be resolved, then processing continues at step 1355. The type of object and the return type of each member in the series is determined at step 1355.

If it is determined at decision step 1356 that the data type of the last property or method is an enumerated type, then the list of members of this enumerated type is generated and displayed in an assist window at step 1357. Processing continues at step 1370. Alternatively, if it is determined at decision step 1356 that the data type of the last property or method is not an enumerated type or other type that can be resolved based on presently available information, then processing continues to step 1358. At step 1358, a menu of possible choices is generated and displayed in a selection menu assist window. Processing then continues at step 1370.

The operational steps of branch 1360 illustrate the process of generating a member list resulting from a manual request. At step 1361, the programming language statement is parsed as previously disclosed. At step 1362, the compiler is invoked to bind the entire expression excluding the last identifier of the expression. At step 1365, a member list is assembled in view of the context of the remaining expression that includes the list of member functions and variables of the returned symbol. The generated list is displayed in a selection menu assist window. Note that the last identifier in the expression which was ignored for binding purposes, is identified in the assist window as the initial selection of the displayed member list. Processing then continues at step 1370.

Global lists and other miscellaneous lists are generated in a manner similar to the above argument lists, constant lists, and/or member lists as appropriate and in view of the symbol information that is available to the compiler at the time the request is made. For example, a reference to the symbol VBA in normal programming language code shows all callable procedures and all constants defined in the VBA library. However, the reference as VBA shows all types of defined in the VBA library. The resolved symbol appears similar, but a different category of information is pulled from the symbol lists maintained by the compiler to satisfy both requests.

What is claimed:

1. A computer readable storage medium comprising computer executable instructions that when executed by a processor cause said processor to perform a method for assisting a computer programmer in real time to complete a programming language statement in a computer program, said method comprising:
   enabling a programming language editor having a character position cursor and a randomly positionable pointer;
   partially compiling available ones of a plurality of programming language statements in said computer program;
   automatically defining a finite set of programming language statement information that is relevant to at least one segment of a present one of said plurality of programming language statements that is proximate to said character position cursor; and
   automatically generating a passive assist window that contains said finite set of programming language statement information in a location proximate to said character position cursor.

2. The computer readable storage medium of claim 1 further comprising instructions for:
   automatically attempting said steps of claim 1 for each character received by said programming language editor.

3. The computer readable storage medium of claim 1 further comprising instructions for:
   attempting said steps of claim 1 on a randomly selected one of said plurality of programming language statements in response to a real time request by said computer programmer.

4. The computer readable storage medium of claim 1 further comprising instructions for:
   attempting said steps of claim 1 on a randomly selected one of said plurality of programming language statements in response to a real time request by said computer programmer at a time when at least one automatic assist window feature is disabled.

5. The computer readable storage medium of claim 1 further comprising instructions for:
   generating a simultaneous plurality of passive assist windows that each contain a finite set of programming language statement information in a location proximate to said character position cursor, said simultaneous plurality of passive assist windows being selected from at least one of a group comprised of: a selection menu assist window and an informational display assist window.

6. The computer readable storage medium of claim 1 wherein said step of defining further comprises:
   generating said finite list as a selectable list of menu items that can each validly complete said at least one segment of said present programming language statement that is proximate to said character positioned cursor.

7. The computer readable storage medium of claim 1 wherein said step of generating further comprises:
   creating a selection menu assist window comprised of said list of menu items; and enabling window control features for said selection menu assist window.

8. The computer readable storage medium of claim 6 further comprising instructions for:
   replacing said at least one segment of said present programming language statement with one said list of menu items in response to an input command by said computer programmer.

9. The computer readable storage medium of claim 1 wherein said step of defining further comprises instructions for:
   generating an argument list of each argument in said present programming language statement; and
   identifying an argument type for each argument in said argument list selected from at least one of a group comprised of: a mandatory argument and an optional argument.

10. The computer readable storage medium of claim 9 wherein said step of generating further comprises:
    reverse parsing said present programming language statement into a plurality of tokens that each represent an individual component selected from at least one of a group comprised of: an object entity segment and a delimiter, in response to a real time request by said computer programmer distinguishing said plurality of tokens between a procedure call token and any argument token in said argument list; and
    binding said argument list.

11. The computer readable storage medium of claim 1 wherein said step of generating further comprises:
    generating an informational display assist window based on an argument list;
    distinguishing a mandatory argument from an optional argument within said argument list; and
    highlighting a present argument within said argument list that corresponds to a present location of said character position cursor within said present programming language statement.

12. A system for passively assisting a user in real time to complete a programming language statement, said system comprising:
    a programming language editor having a character position cursor and a randomly positioned pointer;
    means for partially compiling available ones of a plurality of programming language statements in a computer program; and
    means for automatically generating an assist window, based in part on the position of said character position cursor, that contains a finite set of programming language statement information in a location proximate to said character position cursor, said assist window being selected from at least one of a group comprised of: a selection menu assist window and an informational display assist window.

13. A system according to claim 12 wherein said means for generating further comprises:

means for identifying a desired menu item from said selection menu assist window; and means for replacing a segment of a present programming language statement at a present location of said character positioned cursor with said desired menu item in response to said means for identifying.

14. A system according to claim 12 further comprising:

means for displaying information in an informational display assist window, said information being related to at least one segment of a present programming language statement that is proximate a present location of said character position cursor and selected from at least one of a group comprised of: a symbol definition, a defined constant, a procedure call map, and an enumerated list.

15. A system according to claim 12 further comprising:

means for automatically enabling said means of claim 12 for each character received by said programming language editor.

16. A system according to claim 12 further comprising:

means for enabling said means of claim 12 on a randomly selected one of said plurality of programming language statements in response to a real time request by said user and independent of any automatic assist feature.

17. A real time computer implemented method for assisting a user to complete a programming language statement in a computer program, said real time method comprising:

the computer enabling a programming language editor having a character position cursor; continuously resolving symbolic portions of available ones of a plurality of programming language statements into a partial program compilation;

the computer identifying a present programming language statement and at least one segment of said present programming language statement based on a location of said character position cursor;

the computer automatically determining a finite set of information related to said present programming language statement and said at least one segment of said present programming language statement based on said partial program compilation; and the computer automatically generating an assist window of said finite set of information in a location proximate to said character position cursor.

18. The computer implemented method according to claim 17 wherein said step of identifying further comprises:

the computer determining an identity of input to said programming language editor by said user;

the computer enabling a reverse parse evaluation of said present programming language statement into identifiable tokens for each of said at least one segment therein in response to said input being an on-demand request by said user;

the computer enabling execution of a editing task in response to said input being a programming language editor command;

the computer enabling a first type of commit of an identified menu item from a selection menu assist window in response to said input being a commit key, wherein said step of enabling a first type of commit includes;

the computer identifying said commit key as a non-delimiter type commit key; and the computer discarding said commit key;

the computer enabling a second type of commit of an identified menu item from a selection menu assist window in response to said input being a commit key, wherein said second type of commit includes:

identifying said commit key as a delimiter type commit key; and inserting said commit key after said identified menu item in said present programming language statement; and adding to said present programming language statement at a location of said character position cursor in response to said input being a non-commit key type input character.

19. The computer implemented method according to claim 17 wherein said step of generating further comprises:

displaying a selection menu assist window where said present programming language statement is identified as an operator embedded programming language statement; and displaying in informational display assist window where said present programming language statement is identified as a non-operator embedded programming language statement.

20. The computer implemented method according to claim 19 wherein said non-operator embedded programming language is a procedure call.

* * * * *

UNITED STATES PATENT AND TRADEMARK OFFICE
CERTIFICATE OF CORRECTION

| | | |
|---|---|---|
| PATENT NO. | : 7,814,461 B2 | Page 1 of 1 |
| APPLICATION NO. | : 11/509248 | |
| DATED | : October 12, 2010 | |
| INVENTOR(S) | : Matthew Shulman et al. | |

It is certified that error appears in the above-identified patent and that said Letters Patent is hereby corrected as shown below:

In column 15, line 13, delete "de" and insert -- details of --, therefor.

Signed and Sealed this
Sixteenth Day of August, 2011

David J. Kappos
*Director of the United States Patent and Trademark Office*